United States Patent Office 2,725,658
Patented Dec. 6, 1955

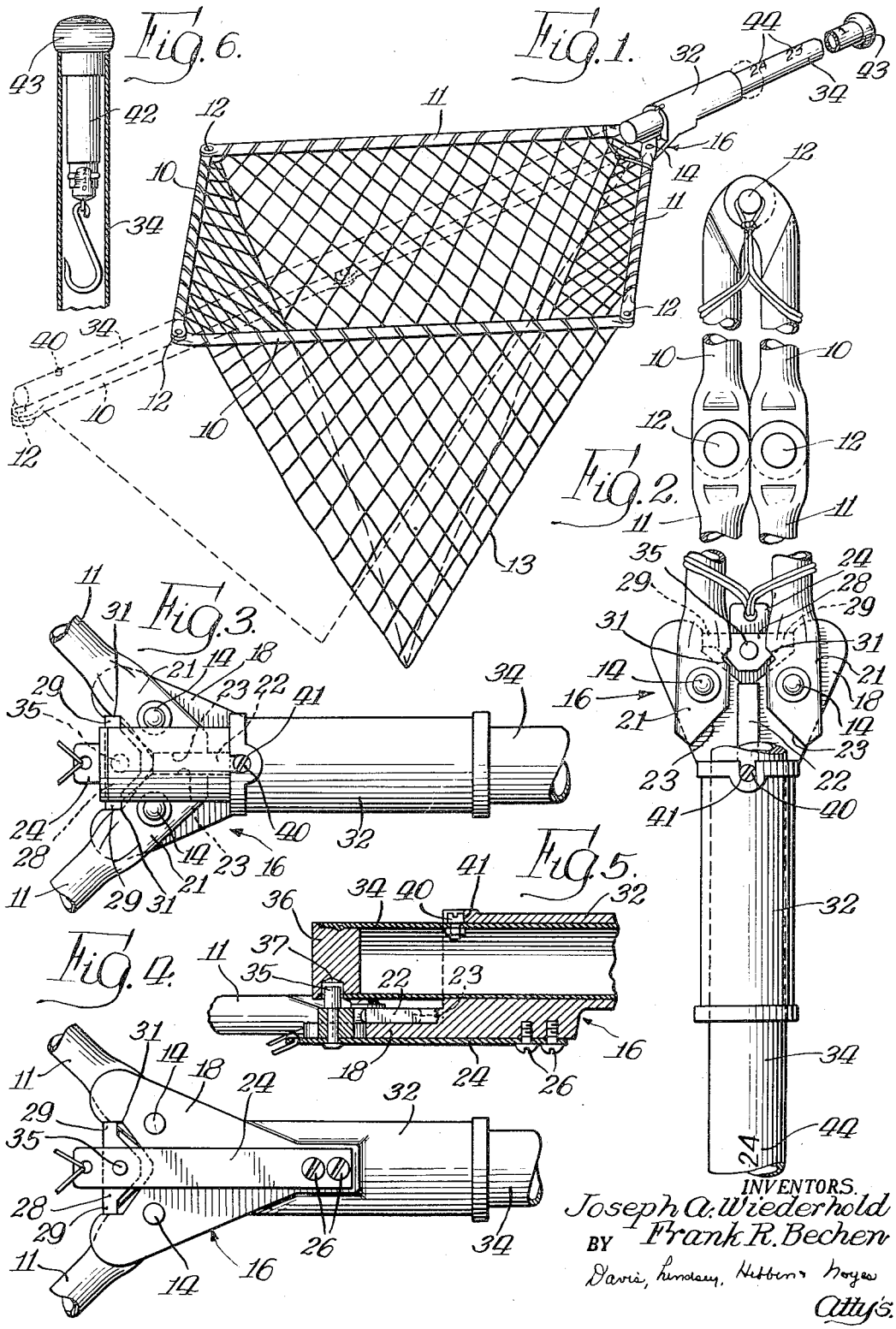

2,725,658

COLLAPSIBLE FISH NET

Joseph A. Wiederhold and Frank R. Bechen, Dubuque, Iowa

Application February 8, 1955, Serial No. 486,813

7 Claims. (Cl. 43—12)

This invention relates to improvements in collapsible nets such as fish nets or the like.

There have been various proposals heretofore for fish landing nets or the like wherein the net portion is collapsible and the handle portion is retractable or detachable in some fashion. However, we have found that there is still a definite need for a compact low cost net of this type, particularly one which can readily be made from light weight materials but can still be rigidly held in open position and can also be manipulated rapidly and conveniently during opening and closing.

Accordingly, a primary object of our invention is to provide a novel and improved collapsible or foldable net having substantial advantages over devices of this general character heretofore suggested.

A further object of the invention is to provide a collapsible net having novel releasable locking means for rigidly holding the net in open position and for retaining a retractable handle in operative position.

Another object of the invention is to provide a collapsible net having a novel arrangement for making the net buoyant so that it will not sink in water and for providing a scale by which a fish may be weighed.

Other objects and advantages of the invention will become apparent from the subsequent detailed description taken in conjunction with the accompanying drawing, wherein:

Fig. 1 is a perspective view of a collapsible fish net comprising one specific embodiment of the invention, the device being illustrated in open or unfolded position in full lines and being shown in collapsed condition in broken lines.

Fig. 2 is an enlarged fragmentary top plan view of the major portions of the device with the net in collapsed or folded position.

Fig. 3 is a fragmentary top plan view of the device with the net in open position.

Fig. 4 is a bottom plan view of the portion of the device shown in Fig. 3; and

Fig. 5 is a fragmentary sectional view, showing the operation of the locking means of the device.

Referring to the drawing, the device comprises two pairs of arms or bars 10 and 11 which are pivotally connected to each other as at 12, to form a rectangle or square when in open position as shown in full lines in Fig. 1. These bars 10 and 11 are preferably formed from a light weight tubular material such as aluminum tubing. A net 13 is suspended from the bars 10 and 11 and is collapsible or opened in accordance with pivotal closing and opening of the interconnected bars. The bars 11 are also pivotally connected, as at 14, to a central base or support member designated generally at 16.

The base or support member 16 is in the form of a unitary plate having a flat end portion 18. The inner ends of the bars 11 are flattened, as at 21, and are swingably secured to the upper side of the flat end portion 18 of the base 16 by means of the pivot elements 14 extending through the flattened end portions 21 into the base portion 18. For limiting the extent of outward pivoting or opening movement of the bars 11, a rib 22 is provided on the base portion 18 and the ends of the bars 11 have slanted edges 23 adapted to abut against the outer sides of the rib 22 as seen in Fig. 3. Thus, the bars 11 are prevented from spreading beyond approximately a right angular or perpendicular relationship.

For holding the arms 11 in the spread apart or open position of Fig. 3, we provide a releasable spring lock means comprising an elongated resilient tongue 24 which is rigidly secured, as by a pair of screws 26, to the underside of the base 18. The spring tongue 24 extends beyond the forward end of the base portion 18. At the outermost end of the tongue 24 a lock means comprising a transverse wedge block or detent 28 is mounted and extends between the net-suspending bars 11. The opposite end portions of the detent 28 are squared, as at 29, and are adapted to interfit with or engage in a pair of cooperating notches 31 formed at the inner sides of the flattened end portions 21 of the bars 11. The resilient character of the elongated spring tongue 24 is such that the detent or block 28 is inherently held in locking relation with the squared ends 29 engaged in the notches 31 so that the arms 11 are rigidly held in open position and in engagement with the rib 22. For releasing the locking device to permit collapsing of the net, the spring tongue 24 can readily be depressed or deflected as is apparent in Fig. 5, so that the block 28 is disengaged from the arms 11 thereby permitting the net-suspending arms to be folded in parallel side-by-side collapsed relation.

On the uppermost side of the base portion 18 a tubular member or mounting sleeve 32 is provided. In the present instance, the base 18 and sleeve 32 are cast as a unit. An elongated handle 34, which is also preferably of light weight tubular metal such as aluminum, is slidably disposed in the mounting sleeve 32. The sleeve 32 is laterally offset from the plane of the base 18, so that the handle 34, as will be apparent particularly from Fig. 1, can be shifted forwardly into retracted position overlying the folded net-suspending bars 10 and 11 and it can also be shifted rearwardly to extended position for normal usage of the net.

To hold the handle in its operative or extended positions, the lock means for holding the bars 11 in their spread-apart position is provided with a portion engageable with the handle 34 when the lock means is in locking position. Thus, the detent or block 28 at its midpoint is provided with a pin 35 engageable with the end of the handle, which is arranged to overlie the block 28 when the handle is extended. The end of the handle is provided with a closure plug 36 (see Fig. 5) and a hole 37 is drilled in the handle and plug to receive the pin 35. By this arrangement, when the handle 34 is moved to its extended position and the net-supporting arms are spread so that the block 28 will spring upwardly to engage the bars 11, the pin 35 enters the hole 37 in the handle and holds it in its extended position.

The handle 34 is preferably formed from round tubing and for this reason the handle must be in the proper rotative position for the pin 35 to enter the hole 37. Since the pin 35 is more or less hidden from view by the end portion of the handle, a visible means is provided for insuring the proper rotative position of the handle. In the present instance, this means is provided by interengaging parts on the handle and sleeve 32, preferably in the form of a screw 40 threaded into the handle and a notch 41 formed in the end of the sleeve 32. Thus, when the screw 40 enters the notch 41, the hole 37 is aligned with the pin 35.

While the frame and handle portions of the net are made of metal, the construction is such that the net will float if it should be accidentally dropped in the water. To this end, the parts are made of aluminum as heretofore stated, and the bars 10 and 11 as well as the handle 34 are all tubular and are closed at their ends to render them buoyant. In the case of the arms 10 and 11, the flattening of the ends thereof to provide for the pivotal connections effectively seals the ends.

In the case of the handle 34, one end thereof is closed by the plug 36. The other end is adapted to be closed by a means which gives an added feature to the net. Thus, I provide a small scale 42 (see Fig. 6) which may be inserted in the end of the handle, by which fish may be weighed. The scale 42 is provided with a grasping portion 43 a part of which fits snugly in the end of the tubular handle and provides an effective seal therefor. The grasping portion has a frictional fit in the end of the tube so that the scale can easily be withdrawn when desired.

Because of legal length limits with certain kinds of fish, a fisherman likes to have a rule available for measuring a catch. For this reason, the tubular handle 34 may be provided with numerals 44 indicating inch marks (see Figs. 1 and 2) along its length, which provide a convenient means for measuring a fish.

From the foregoing, it will be evident that our invention permits a relatively inexpensive and light weight construction while at the same time affording a compact and rapidly manipulatable arrangement. Moreover, in spite of the light weight collapsible construction, the net can be rigidly locked in open position with the handle in extended position for withstanding relatively severe usage.

Although the invention has been described with particular reference to a specific structural embodiment thereof, it is to be understood that various modifications and equivalent structures may be resorted to without departing from the scope of the invention as defined in the appended claims.

We claim:

1. In a collapsible net having a plurality of pivotally connected foldable arms with a net suspended therefrom, a support, a pair of said net-suspending arms being pivotally connected at their ends to said support, said arms being swingable outwardly away from each other for opening the net and being swingable toward each other in side-by-side folded relation for collapsing the net, releasable spring lock means mounted on said support and having a portion releasably engageable with said arms for holding the latter in spread-apart position, handle mounting means rigidly carried on said support, and an elongated handle movably disposed on said mounting means for movement between retracted and extended positions, said lock means including a portion engageable with said handle to hold it in extended position.

2. In a collapsible net having a plurality of pivotally connected foldable arms with a net suspended therefrom, a base, a pair of said net-suspending arms being pivotally attached to said base, said arms being swingable between spread-apart and folded side-by-side positions, a tubular sleeve rigidly mounted on said base in offset relation thereto, an elongated handle slidably mounted in said sleeve for movement between retracted and extended positions relative to the net, locking means mounted on said base and engageable with said pair of arms for holding them in spread-apart position, the offset relation of said sleeve affording clearance to permit said handle to overlie said arms and said locking means, and means on said locking means engageable with said handle for holding it in extended position.

3. In a collapsible net having a plurality of pivotally connected foldable arms with a net suspended therefrom, a support, a pair of said net-suspending arms being pivotally connected at their ends to one side of said support, said arms being swingable outwardly away from each other for opening the net and being swingable toward each other in side-by-side folded relation for collapsing the net, a resilient tongue secured at one end to the opposite side of said support and extending beyond said support and between said arms, and a detent carried at the other end of said tongue and projecting laterally therefrom to engage said arms for holding the latter in open position, a sleeve on said one side of said support in laterally offset relation thereto, an elongated handle slidably mounted in said sleeve with the offset relation permitting said handle to overlie said arms, said handle being shiftable between retracted and extended positions relative to said net, and a pin extending from said detent for engaging said handle when in extended position.

4. In a collapsible net having a plurality of pivotally connected foldable arms with a net suspended therefrom, a support, a pair of said net-suspending arms being pivotally connected at their ends to said support, said arms being swingable outwardly away from each other for opening the net and being swingable toward each other in side-by-side folded relation for collapsing the net, a rib formed on said support engageable by the pivoted ends of said arms for limiting the extent of outward pivoting of said arms, an elongated spring tongue rigidly secured at one end to said support and extending at its opposite end beyond said support and between said arms, a block carried at said opposite end of said tongue and having end portions adapted to engage said arms for holding them in open position against said rib, a handle shiftably mounted on said support for movement between retracted and extended positions, and a pin projecting from said block and engageable with said handle when the latter is in extended position and when said block is in engagement with said arms.

5. In a collapsible net having a plurality of pivotally connected foldable arms with a net suspended therefrom, a support, a pair of said arms being pivotally mounted on said support for swinging movement between spread-apart and folded side-by-side positions, a detent resiliently mounted on said support for engaging said arms to hold them in spread-apart relation, a sleeve on said support, a handle slidably mounted in said sleeve for movement between retracted and extended positions, one end of said handle when in extended position overlying said detent, said end of the handle having a transverse hole and said detent having a pin engageable in said hole to hold the handle in extended position, and interengaging means on said handle and said sleeve to hold said handle in proper rotative adjustment for said pin to enter said hole.

6. In a collapsible net having a plurality of pivotally connected foldable arms with a net suspended therefrom, a support, a pair of said net-suspending arms being pivotally connected at their ends to said support, said arms being swingable outwardly away from each other for opening the net and being swingable toward each other in side-by-side folded relation for collapsing the net, a detent resiliently supported on said support and adapted to engage said arms for holding the same in open position, a sleeve on said support, a handle slidably mounted in said sleeve for movement between retracted and extended positions, said handle being a sealed tubular structure to render the net buoyant, one end of said handle when in extended position overlying said detent, a plug for closing said end of the handle with a hole extending laterally through said handle and into said plug, and a pin on said detent and engageable in said hole.

7. In a collapsible net having a plurality of pivotally connected foldable arms with a net suspended therefrom, a support, a pair of said net-suspending arms being pivotally connected at their ends to said support, said arms being swingable outwardly away from each other for opening the net and being swingable toward each other in side-by-side folded relation for collapsing the net, a detent resiliently supported on said support and adapted to engage said arms for holding the same in open position, a handle slidably mounted on said support for movement between retracted and extended positions, means for locking said handle in extended position, said handle being tubular and having seals at its ends to render the net buoyant, and a scale insertible into said handle and having a grasping portion fitting snugly into one end of the handle and constituting the seal for said one end.

References Cited in the file of this patent

UNITED STATES PATENTS

| | | |
|---|---|---|
| 1,450,322 | McElhany | Apr. 3, 1923 |
| 2,620,585 | Delcey | Dec. 8, 1952 |

FOREIGN PATENTS

| | | |
|---|---|---|
| 54,800 | France | Aug. 1, 1950 |
| 186,178 | Great Britain | Sept. 28, 1922 |